United States Patent
Ignatius et al.

(10) Patent No.: US 10,852,487 B1
(45) Date of Patent: Dec. 1, 2020

(54) HARDENED OPTICAL CABLE ASSEMBLIES, OPTICAL PLUG CONNECTOR ASSEMBLIES, OPTICAL RECEPTACLE ASSEMBLIES AND OPTICAL CONNECTION SYSTEMS HAVING MULTIPLE OPTICAL FIBERS

(71) Applicant: CORNING RESEARCH & DEVELOPMENT CORPORATION, Corning, NY (US)

(72) Inventors: Eric Ignatius, Frankfurt (DE); Michael Wimmer, Berlin (DE)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/536,372

(22) Filed: Aug. 9, 2019

(51) Int. Cl.
    *G02B 6/38* (2006.01)
(52) U.S. Cl.
    CPC .......... *G02B 6/3831* (2013.01); *G02B 6/387* (2013.01); *G02B 6/3825* (2013.01); *G02B 6/3878* (2013.01)
(58) Field of Classification Search
    None
    See application file for complete search history.

(56) References Cited

U.S. PATENT DOCUMENTS

| 7,090,406 | B2 | 8/2006 | Melton et al. |
| 7,244,066 | B2 | 7/2007 | Theuerkorn |
| 7,771,039 | B2 | 8/2010 | Sakagami |
| 9,069,151 | B2 | 6/2015 | Conner |
| 9,829,653 | B1* | 11/2017 | Nishiguchi .......... G02B 6/3821 |
| 9,864,156 | B1 | 1/2018 | Menguy |
| 10,133,011 | B2 | 11/2018 | Huang et al. |
| 2004/0223699 | A1* | 11/2004 | Melton ................ G02B 6/3869 385/53 |
| 2009/0148101 | A1* | 6/2009 | Lu ........................ G02B 6/3894 385/56 |
| 2011/0075971 | A1 | 3/2011 | Elenbaas et al. |
| 2013/0322828 | A1* | 12/2013 | Busse .................. G02B 6/3825 385/77 |

(Continued)

OTHER PUBLICATIONS

Flockett; "Smallest Rugged Fibre Optic Connector Launched" ; Electronic Specifier; 4 Pages; May 1, 2018.

(Continued)

*Primary Examiner* — Michael Stahl
(74) *Attorney, Agent, or Firm* — Michael E. Carroll, Jr.

(57) ABSTRACT

An optical plug connector assembly includes a shroud including at least one finger extending forward from the front portion of the shroud, a retention housing positioned at least partially within a shroud passageway of the shroud, the retention housing defining a retention housing passageway defining a front passageway positioned at the front portion of the retention housing and a rear passageway positioned at the rear portion of the retention housing, where the front passageway defines an inner span that is greater than an inner span of the rear passageway, and a connector housing positioned at least partially within the retention housing passageway, the connector housing including a ferrule retention portion positioned at a front portion of the connector housing, where the ferrule retention portion of the connector housing is structurally configured to retain a plurality of ferrules.

35 Claims, 10 Drawing Sheets

(56) References Cited

U.S. PATENT DOCUMENTS

2016/0004018 A1* 1/2016 Lu ..................... G02B 6/3879
385/78
2017/0227719 A1* 8/2017 Zimmel ............. G02B 6/3887
2017/0365962 A1 12/2017 Gniadek

OTHER PUBLICATIONS

IEC International Standard; "Fibre Optic Interconnecting Devices and Passive Components—Fiber Optic Connector Interfaces—Part 34: Type Urm Connector Family"; IEC 61754-34 (Sep. 2016); https://www.vde-verlag.de/iec-normen/preview-pdf/info_iec61754-34%7Bed1.0%7Db.pdf.
Bulgin, Super Fast. Reliable. Connections.; Accessed Oct. 21, 2019; 7 pages https://www.bulgin.com/.
EUROMICRON® GMBH; Accessed Oct. 22, 2019; 3 pages; http://en.euromicron-fiberoptic.com/.
Harting Technology Group; Accessed Oct. 22, 2019; 5 pages; http://www.harting.com/fileadmin/harting/documents/public/catalogue/10_7475_pushpull_e.pdf.
Prysmian Group; Linking the Future; Accessed Oct. 21, 2019; 4 pages; http://nl.prysmiangroup.com/nl/business_markets/markets/telecom-solutions/solutions/xsnet-fttx-solutions/indoor-solutions/jetnetxs/pre-connectorized-cables/.

* cited by examiner

HARDENED OPTICAL CABLE ASSEMBLIES, OPTICAL PLUG CONNECTOR ASSEMBLIES, OPTICAL RECEPTACLE ASSEMBLIES AND OPTICAL CONNECTION SYSTEMS HAVING MULTIPLE OPTICAL FIBERS

BACKGROUND

The present disclosure generally relates to high-bandwidth optical communication and, more particularly, to optical connectors and optical cable assemblies for use in optical networks that deliver multiple fibers to a premises.

Communication networks are used to transport a variety of signals such as voice, video, data transmission, and the like. Traditional communication networks use copper wires in cables for transporting information and data. However, copper cables have drawbacks because they are large, heavy, and can only transmit a relatively limited amount of data. On the other hand, an optical waveguide is capable of transmitting an extremely large amount of bandwidth compared with a copper conductor. Moreover, an optical waveguide cable is much lighter and smaller compared with a copper cable having the same bandwidth capacity. Consequently, optical waveguide cables replaced most of the copper cables in long-haul communication network links, thereby providing greater bandwidth capacity for long-haul links. However, many of these long-haul links have bandwidth capacity that is not being used. This is due in part to communication networks that use copper cables for distribution and/or drop links on the subscriber side of the central office. In other words, subscribers have a limited amount of available bandwidth due to the constraints of copper cables in the communication network. Stated another way, the copper cables are a bottleneck that inhibit the subscriber from utilizing the relatively high-bandwidth capacity of the long-hauls links.

Optical cables used as a drop link to a subscriber conventionally include only a single optical fiber, which has several disadvantages, such as reduced data capacity, lack of redundancy and the like.

SUMMARY

In one embodiment, an optical plug connector assembly includes a shroud extending between a front portion and a rear portion positioned opposite the front portion, where the shroud defines a shroud passageway extending between the front portion and the rear portion of the shroud, and the shroud includes at least one finger extending forward from the front portion of the shroud, a retention housing positioned at least partially within the shroud passageway, the retention housing defining a front portion and a rear portion positioned opposite the front portion of the retention housing, and a retention housing passageway extending between the rear portion and the front portion, the retention housing passageway defining a front passageway positioned at the front portion of the retention housing and a rear passageway positioned at the rear portion of the retention housing, where the front passageway defines an inner span that is greater than an inner span of the rear passageway, and a connector housing positioned at least partially within the retention housing passageway, the connector housing including a ferrule retention portion positioned at a front portion of the connector housing, where the ferrule retention portion of the connector housing is structurally configured to retain a plurality of ferrules.

In another embodiment, an optical cable assembly includes a cable including a cable jacket, and a plurality of optical fibers positioned within the cable jacket, an optical plug connector assembly including a shroud extending between a front portion and a rear portion positioned opposite the front portion, where the shroud defines a shroud passageway extending between the front portion and the rear portion of the shroud, and the shroud includes at least one finger extending forward from the front portion of the shroud, a retention housing positioned at least partially within the shroud passageway, the retention housing defining a front portion and a rear portion positioned opposite the front portion of the retention housing, and a retention housing passageway extending between the rear portion and the front portion, the retention housing passageway defining a front passageway positioned at the front portion of the retention housing and a rear passageway positioned at the rear portion of the retention housing, where the front passageway defines an inner span that is greater than an inner span of the rear passageway, and a connector housing positioned at least partially within the retention housing passageway, the connector housing including a ferrule retention portion positioned at a front portion of the connector housing, and a plurality of ferrules, where each of the plurality of ferrules terminate an associated optical fiber of the plurality of optical fibers of the cable, where the plurality of ferrules are positioned at least partially within the ferrule retention portion of the connector housing.

In yet another embodiment, an optical receptacle assembly includes a receptacle housing including a body portion, wherein the receptacle housing defines a receptacle passage, an adapter sleeve positioned at least partially within the receptacle passage of the receptacle housing, the adapter sleeve including a sleeve passage and a sleeve inner threaded surface, an adapter housing disposed within the receptacle passage, the adapter housing defining a connector opening, and a receptacle optical connector positioned at least partially within the connector opening of the adapter housing, the receptacle optical connector including a receptacle ferrule retention portion positioned at a front portion of the receptacle optical connector, wherein the receptacle ferrule retention portion is structurally configured to retain a plurality of ferrules.

In yet another embodiment, an optical connection system includes an optical receptacle assembly including a receptacle housing including a body portion, where the receptacle housing defines a receptacle passage, an adapter sleeve disposed within the receptacle passage of the receptacle housing, the adapter sleeve including a sleeve passage and a sleeve inner threaded surface, an adapter housing disposed within the receptacle passage, the adapter housing defining a connector opening, and a receptacle optical connector positioned at least partially within the connector opening of the adapter housing, the receptacle optical connector including a receptacle ferrule retention portion positioned at a front portion of the receptacle optical connector, and a plurality of receptacle ferrules positioned at least partially within the receptacle ferrule retention portion of the receptacle optical connector, an optical cable assembly including a cable including a cable jacket, and a plurality of optical fibers positioned within the cable jacket, an optical plug connector assembly including a shroud extending between a front portion and a rear portion positioned opposite the front portion, where the shroud defines a shroud passageway extending between the front portion and the rear portion of the shroud, and the shroud includes at least one finger extending forward from the front portion of the shroud, a retention housing positioned at least partially within the shroud passageway, the retention housing defining a front portion and a rear portion positioned opposite the front portion of the retention housing, and a retention housing passageway extending between the rear portion and the front portion, the retention housing passageway defining a front passageway positioned at the front portion of the retention housing and a rear passageway positioned at the rear portion of the retention housing, where the front passageway defines an inner span that is greater than an inner span of the rear passageway, and a connector housing positioned at least partially within the retention housing passageway, the connector housing including a ferrule retention portion positioned at a front portion of the connector housing, and a plurality of ferrules, where each of the plurality of ferrules terminate an associated optical fiber of the plurality of optical fibers of the cable, where the plurality of ferrules are positioned at least partially within the ferrule retention portion of the connector housing and each of the plurality of ferrules are aligned with associated receptacle ferrules of the plurality of receptacle ferrules.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

DETAILED DESCRIPTION

Figures 1A, 1B:
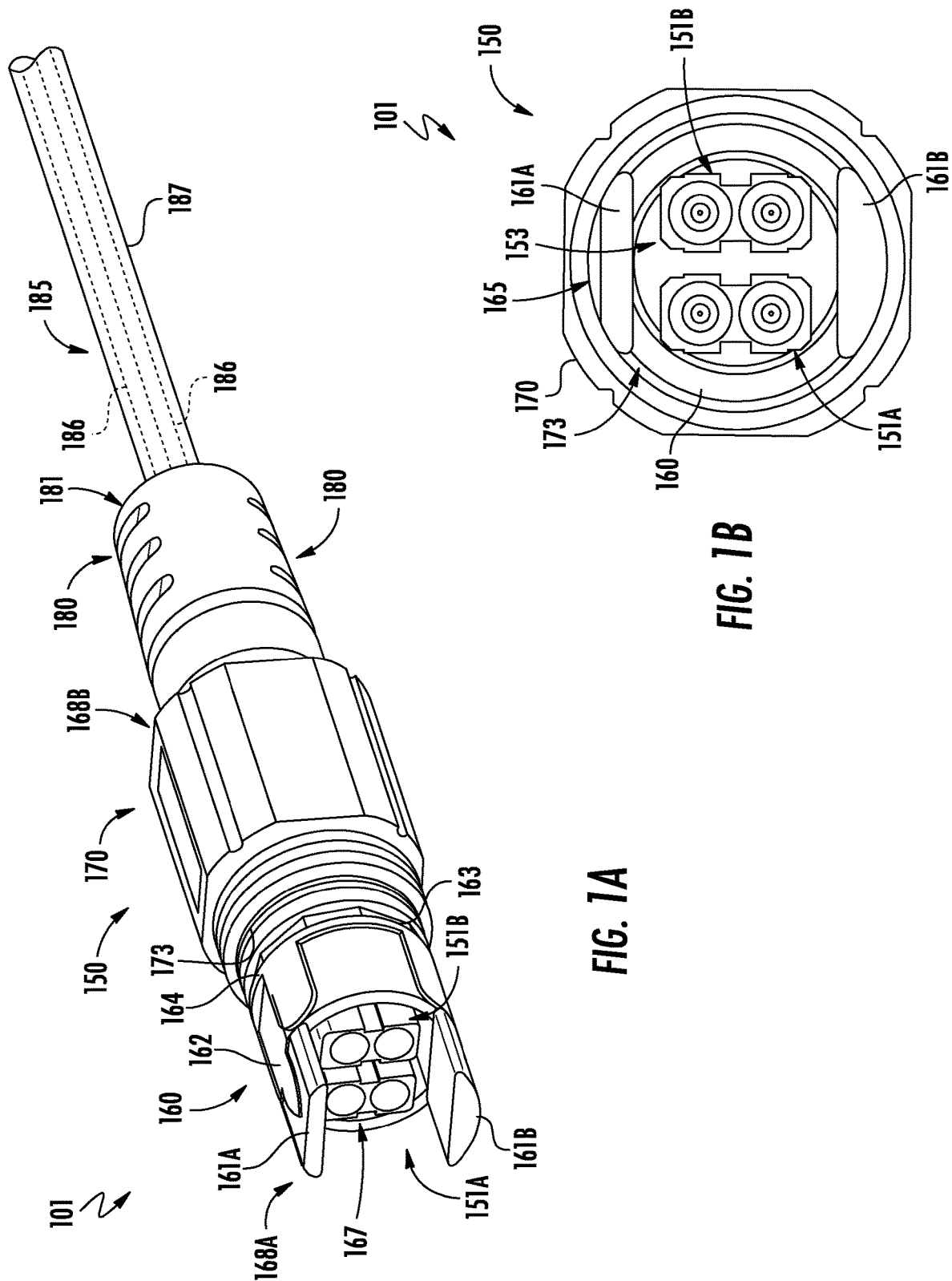
FIG. 1A schematically depicts a perspective view of an example optical cable assembly, according to one or more embodiments described and depicted herein.
FIG. 1B schematically depicts a front view of the optical cable assembly of FIG. 1A, according to one or more embodiments described and depicted herein.

Embodiments are directed to optical cables and connectors in an optical waveguide network, and particularly in optical cables and connectors providing fiber-to-the-location-'x' (FTTx), where 'x' in the acronym represents the end location of the optical waveguide. For instance, FTTC represents a fiber to the curb application, and FTTP represents a fiber to the premises application. FTTP architectures advantageously route at least one optical waveguide to the premises, thereby providing a high bandwidth connection to the subscriber. Applications to locations other than to the curb or premises are also possible. In such networks, a drop link provides the optical fiber to the location. In the embodiments of the present disclosure, a drop link comprises a preconnectorized fiber optic drop cable (hereinafter an optical cable assembly) suitable for outdoor environments. Preconnectorized cable assemblies described herein effectively and economically streamline the deployment and installation of optical waveguides into the last mile of the fiber optic network such as to the premises. Although, the network described above is directed to one type of FTTx architecture, other networks can employ the embodiments of the present disclosure. Other networks may include other suitable components such as distribution closures, amplifiers, couplers, transducers, or the like. Likewise, other networks besides FTTx architectures can also benefit from the concepts of the present disclosure.

Preconnectorized optical cable assemblies may be routed to a premises using different exemplary techniques. Preconnectorized optical cable assemblies may be routed to premises in an aerial application. Alternatively, preconnectorized optical cable assemblies may be routed to a premises in a buried application. In the aerial application, a first end of the preconnectorized cable assembly is attached at a first interface device located on a pole, and a second end is attached at an interface device located at the subscriber premises. In buried applications, the first and second ends of a preconnectorized optical cable assembly are respectively connected to an interface device located inside an enclosure at ground-level and at an interface device at the premises (e.g., an exterior wall of the premises). The interface devices include at least one optical receptacle for making the optical connection with an end of preconnectorized optical cable assembly.

Conventional preconnectorized fiber optic drop cables have a single optical fiber that is routed to the premises. In embodiments of the present disclosure, multiple optical fibers are included in the preconnectorized optical cable assembly that is used as a drop link. Increasing the number of optical fibers in the drop link to a single premise includes several advantages. For example, including additional fibers in the optical cable assembly provides redundancy. If one optical fiber breaks or fails, other optical fibers may be used. Multiple optical fibers also provide increased data capacity. Furthermore, multiple optical fibers allow for different communication protocols may be utilized within a single cable. For example, a first communication protocol can be used on a first optical fiber and a second communication protocol on a second optical fiber. The use of multiple optical fibers also may allow for network sharing between service providers. Moreover, the main cost in installing a drop link is the cable installation, thus, adding an additional optical fiber and internal optical connector does not add significant cost. Various embodiments of optical connection systems including multiple optical fibers will be described herein with specific reference to the appended drawings.

Referring to FIGS. 1A-1B, an example optical cable assembly 101 including optical plug connector assembly 150 is schematically depicted. The optical cable assembly 101 generally includes a cable 185 comprising a cable jacket 187 and a plurality of optical fibers 186 positioned within the cable jacket 187. The cable jacket 187 generally protects the plurality of optical fibers 186 from environmental elements, and may include a polymer or the like. In the embodiment depicted in FIGS. 1A-1B, the plurality of optical fibers 186 includes four individual optical fibers, however, it should be understood that in embodiments, the cable 185 may include any suitable number of optical fibers. Furthermore, while in the embodiment depicted in FIGS. 1A-1B, the cable 185 is depicted as including only the plurality of optical fibers 186, it should be understood that in some embodiments, the cable 185 may include additional components and features. For example, in some embodiments, the cable 185 includes one or more strength elements that may reduce strain on the plurality of optical fibers 186. In some embodiments, the cable 185 includes one or more wires, such as copper wires or the like, for the transmission of power and/or electrical signals.

The optical plug connector assembly 150 generally includes a shroud 160, a retention housing 153, and at least one connector housing 151A. In the embodiment depicted in FIGS. 1A-1B, the optical plug connector assembly 150 includes a first connector housing 151A and a second connector housing 151B, and includes a coupling nut 170 is positioned over the shroud 160. In some embodiments, the first connector housing 151A and the second connector housing 151B are captured by the retention housing 153. In some embodiments, the first connector housing 151A and/or the second connector housing 151B are integrated with the retention housing 153.

Figure 1C:
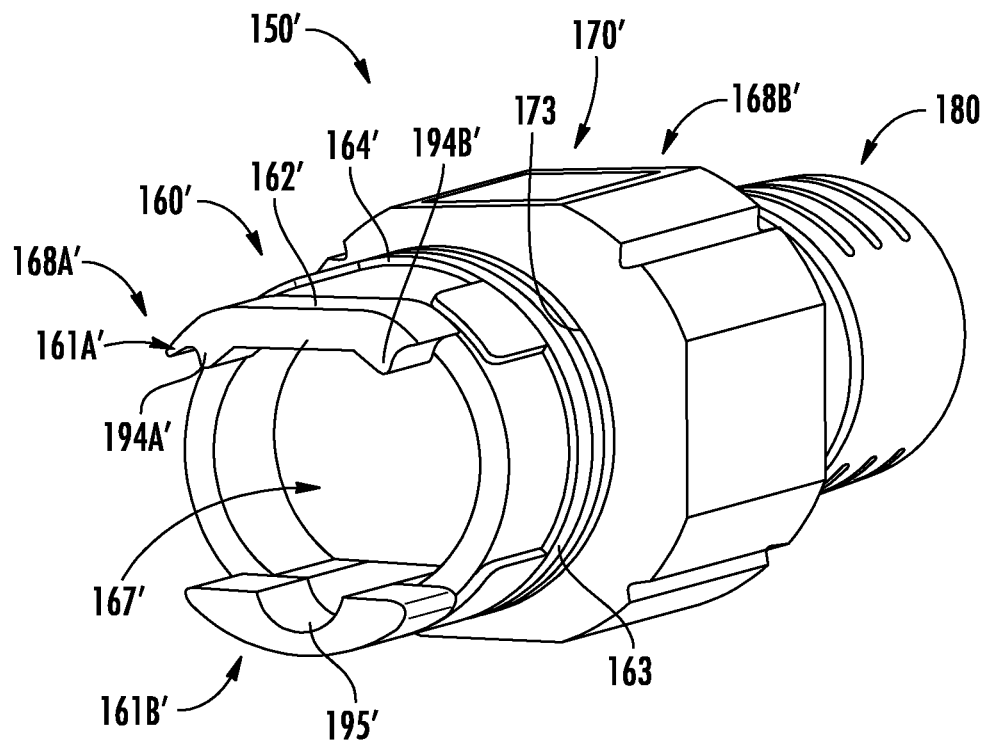
FIG. 1C schematically depicts a perspective view of a shroud of an example optical plug connector assembly, according to one or more embodiments described and depicted herein.
Figure 1D:
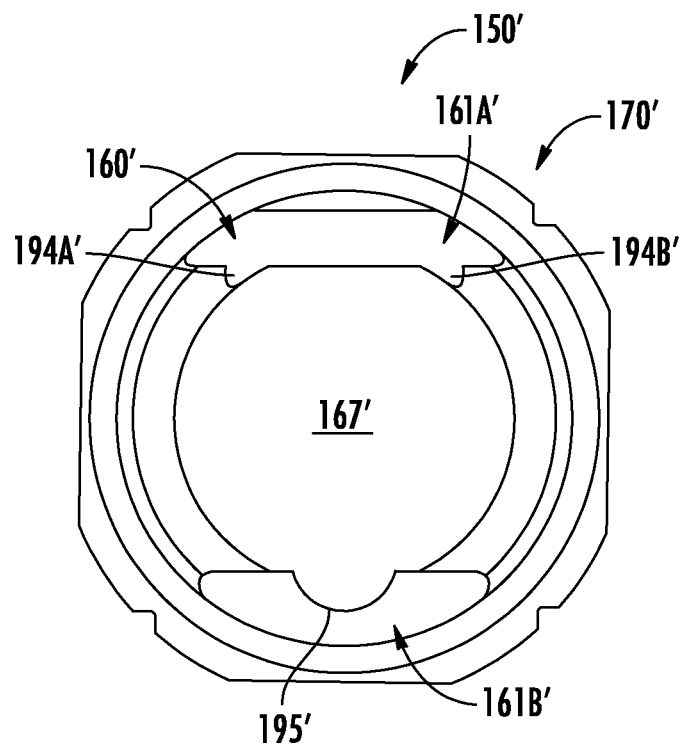
FIG. 1D schematically depicts a front view of the shroud of FIG. 1C, according to one or more embodiments described and depicted herein.

The depicted shroud 160 extends between a front portion 168A and a rear portion 168B that is positioned opposite the front portion 168A. In the view depicted in FIGS. 1A-1B the rear portion 168B is obscured by the coupling nut 170. In embodiments, the shroud 160 includes a generally cylindrical shape. As best shown in FIGS. 1C and 1D, the shroud 160 defines a shroud passageway 167 that extends between the front portion 168A and the rear portion 168B. In embodiments, the shroud passageway 167 includes a generally cylindrical shape such that the shroud 160 defines a generally annular shape. While in the embodiment depicted in FIGS. 1A-1D, the shroud passageway 167 defines a generally cylindrical shape, the shroud passageway 167 may include any suitable shape extending through the shroud 160 from the front portion 168A to the rear portion 168B of the shroud 160. In embodiments, the retention housing 153 and the first and second connector housings 151A, 151B are positioned at least partially within the shroud passageway 167.

The shroud 160 includes at least one finger extending forward from the front portion 168A of the shroud 160. In the embodiment depicted in FIGS. 1A-1B, the shroud 160 includes a first finger 161A and a second finger 161B extending forward from the front portion 168A of the shroud 160. In embodiments, the first finger 161A and the second finger 161B are spaced apart from one another along a perimeter of the shroud 160, such that gaps are positioned between the first finger 161A and the second finger 161B as the shroud 160 is rotated about a longitudinal axis extending through the optical plug connector assembly 150.

The first finger 161A and the second finger 161B generally assist in aligning the shroud 160 with an optical receptacle assembly during mating, as described in greater detail herein. In embodiments, the first and second fingers 161A, 161B may extend beyond the first and second connector housings 151A, 151B as shown in FIG. 1A. By extending beyond the first and second connector housings 151A, 151B, the first and second fingers 161A, 161B may restrict inadvertent contact with the first and second connector housings 151A, 151B, thereby protecting the first and second connector housings 151A, 151B.

As shown in FIGS. 1A-1B, the first and second fingers 161A, 161B have different shapes that correspond to complementary shapes within an optical receptacle assembly, as described in greater detail herein. By having different shapes, the first and second fingers 161A, 161B may restrict insertion of the optical plug connector assembly 150 into an optical receptacle assembly, such that the optical plug connector assembly 150 may only be inserted in a desired rotational orientation. In the depicted embodiment, the first finger 161A includes alignment indicia 162 that can assist a craftsman in identifying the appropriate rotational orientation of the optical plug connector assembly 150, so that the craftsman can quickly and easily mate the optical plug connector assembly 150 with the optical receptacle assembly. In this case, the alignment indicia 162 is an arrow molded into the first finger 161A; however, other suitable indicia are contemplated.

FIGS. 1C and 1D show an alternative optical plug connector assembly 150' in which at least one of the first finger 161A' and/or the second finger 161B' have at least one discrete keying feature. In the example of FIGS. 1C and 1D, the first finger 161A' has keying protrusions extending downward from edges of the first finger 161A' (e.g., a first keying protrusion 194A' at a first edge and a second keying protrusion 194B' at a second edge). In embodiments, the second finger 161B' has a keying groove 195' extending into an inner surface of the second finger 161B'. The first and second keying protrusions 194A', 194B' and/or the keying groove 195', in embodiments, correspond to complementary keying features of an appropriate optical receptacle, such that optical plug connector assemblies 150' may be inserted into the appropriate optical receptacle while plug connector assemblies not including the first and second keying protrusions 194A', 194B' and/or the keying groove 195' may not be inserted into the optical receptacle. Similarly, optical receptacles that are inappropriate for the optical plug connector assembly 150' (e.g., optical receptacles configured to receive optical plug connector assemblies including a single optical fiber) may generally include keying features that prevent insertion of the optical plug connector assembly 150' including the first and second keying protrusions 194A', 194B' and/or the keying groove 195'.

Referring to FIGS. 1A-1D, in embodiments, a medial portion of the shroud 160 has a groove 164 for seating a sealing member 163, such as an O-ring, that provides a weatherproof seal between the optical plug connector assembly 150 and an optical receptacle assembly (or, in some embodiments, a protective cap (not shown)).

In embodiments, a boot 180 is slid over a portion of the shroud 160 (and heat shrink tubing, if utilized). The boot 180 may be formed from a flexible material such as KRAYTON. The boot 180 (and heat shrink tubing, if utilized) generally inhibit kinking and provide bending strain relief to the fiber optic cable 185 near optical plug connector assembly 150.

The boot 180 has a longitudinal boot passage 181 with a stepped profile therethrough. The first end of the boot passage 181 is sized to fit over the rear portion 168B of the shroud 160 (and heat shrink tubing if utilized). The first end of the boot passage 181 has a stepped down portion sized for the optical cable 185 and acts as stop for indicating that the boot 180 is fully seated. After the boot 180 is seated, the coupling nut 170 is slid up along the shroud 160. The coupling nut 170 has a coupling nut passageway 173 sized so that it fits over the shroud 160. A wire assembly or ring (not shown) can be secured to the boot 180 at an end closest to the coupling nut 170 such that the coupling nut 170 is captured between a shoulder of the shroud 160 at the front end and the wire assembly (or other feature) on the boot 180.

Figure 5:
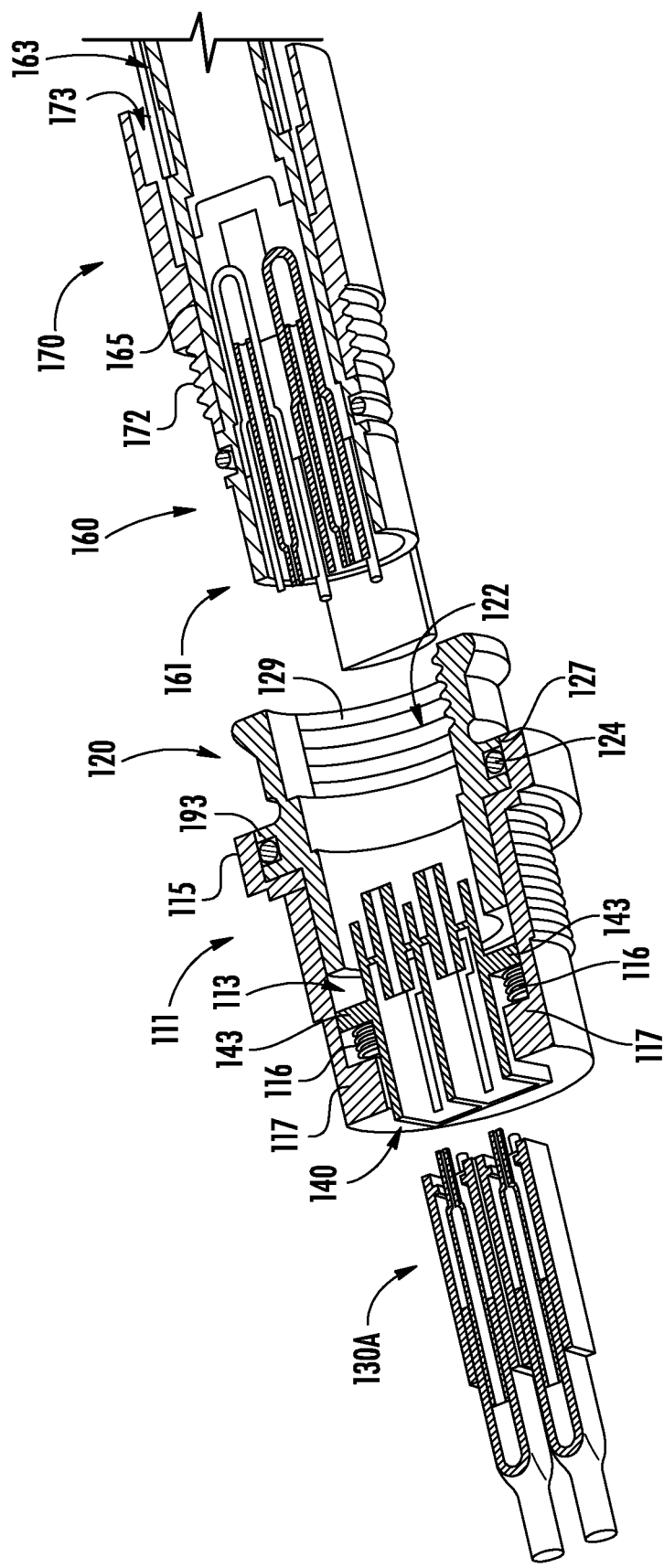
FIG. 5 schematically depicts a section view of the optical connection system of along section 5-5 of FIG. 4B, according to one or more embodiments described and depicted herein.

As best shown in FIG. 5, which depicts a section view of the optical plug connector assembly 150, the shroud 160 defines an outer coupling surface 165 and the coupling nut 170 comprises a threaded outer surface 172. In embodiments, the outer coupling surface 165 of the shroud 160 is positioned at least partially within the coupling nut passageway 173 such that the coupling nut 170 rotates about the outer coupling surface 165 of the shroud 160.

Generally, most of the components of the optical plug connector assembly 150 may be formed from a suitable polymer. As a non-limiting example, the polymer may be a UV stabilized polymer such as ULTEM 2210; however, other suitable materials are possible. For instance, stainless steel or any other suitable metal may be used for various components.

Figures 2A, 2B:
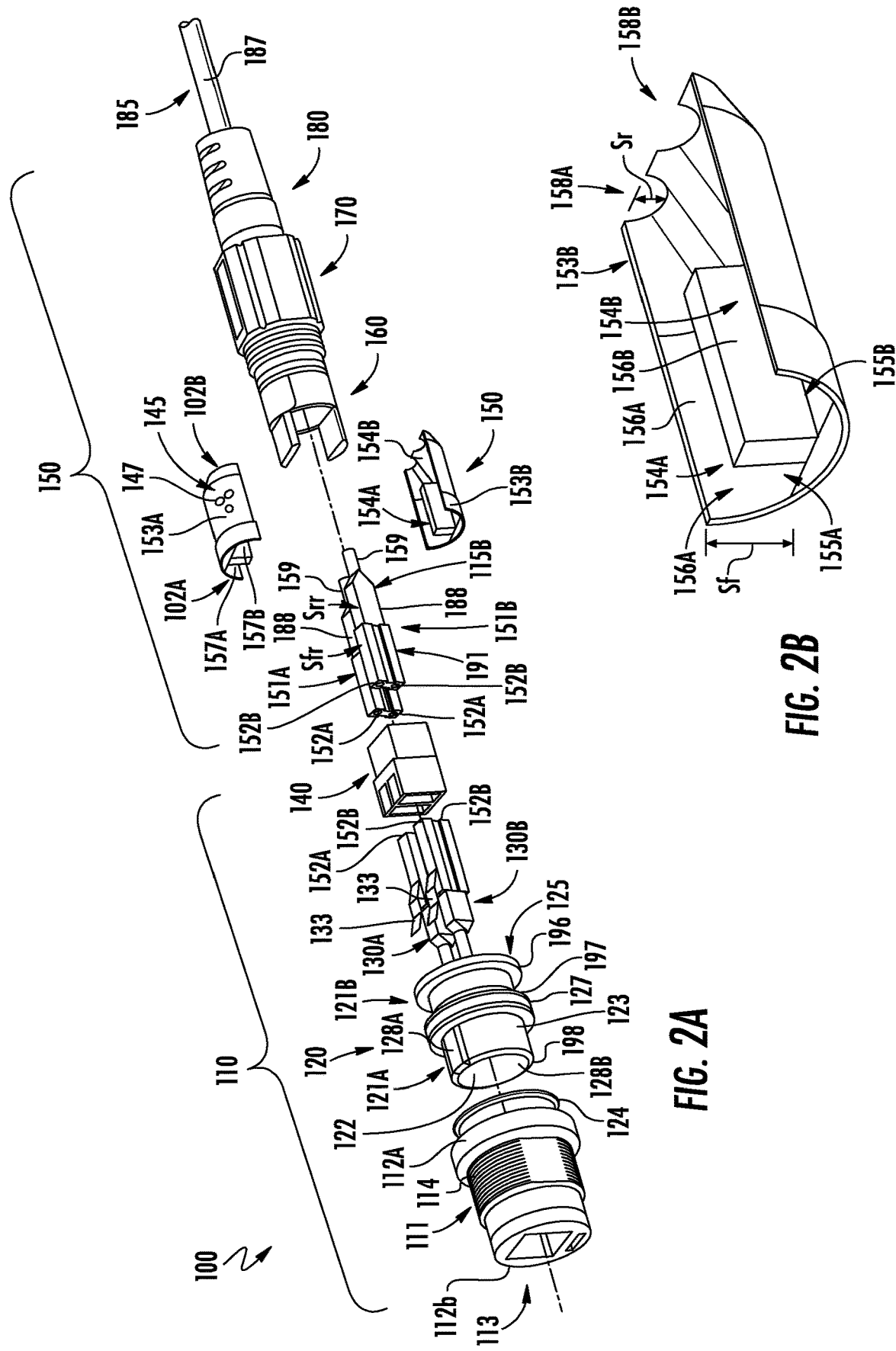
FIG. 2A schematically depicts an exploded view of an optical connection system including an optical cable assembly and an optical receptacle assembly in an un-mated state, according to one or more embodiments described and depicted herein.
FIG. 2B schematically depicts an enlarged view of a retention housing of the optical connection system of FIG. 2A, according to one or more embodiments described and depicted herein.

Referring to FIG. 2A, an exploded view of an optical connection system 100 is schematically depicted. The depicted optical connection system 100 includes the optical plug connector assembly 150, which is insertable within an optical receptacle assembly 110.

In embodiments, the retention housing 153 of the optical plug connector assembly 150 comprises a first half-shell 153A and a second half-shell 153B. In some embodiments, the retention housing 153 is a part of a crimp housing assembly further including a crimp band (not shown) that holds the first half-shell 153A and the second half-shell together 153B. However, in some embodiments, no crimp band is provided, and the first half-shell 153A and the second half-shell 153B may be held together through other suitable methodologies, such as adhesives, mechanical fasteners, or the like that are either separate from or integral with the first and second half-shells 153A, 153B, or the like.

In the embodiment depicted in FIG. 2A, the first half-shell 153A may be identical to the second half-shell 153B. However, in other embodiments the first half-shell 153A and the second half-shell 153B may be different from one another. For example, although the term "half-shell" is used herein, it should be understood that the first half-shell 153A and the second half-shell 153B may include any suitable shells for retaining the first and second connector housings 151A, 151B, and may include shells that are greater than or less than half of the retention housing 153.

It should be understood that each individual half-shell may include a post and a bore, or other engagement features to align the first and second half-shells 153A, 153B with one another. The first and second half-shells 153A, 153B may also include holes 147 for inserting adhesive to secure the optical cables and first and second connector housings 151A, 151B within the retention housing 153.

Referring to both FIGS. 2A and 2B, an enlarged view of the second half-shell 153B is schematically depicted. The retention housing 153 generally defines a front portion 102A and a rear portion 102B positioned opposite the front portion 102A. The retention housing 153 further defines a retention housing passageway 154A extending between the front portion 102A and the rear portion 102B. In the embodiment depicted in FIGS. 2A and 2B, the retention housing passageway 154A is a first retention housing passageway 154A, and the retention housing 153 further defines a second retention housing passageway 154B extending between the front portion 102A and the rear portion 102B of the retention housing 153.

In embodiments, the first half-shell 153A defines a first cavity 157A and the second half-shell 153B defines a second cavity 156A, wherein the first cavity 157A and the second cavity 156A define the first retention housing passageway 154A when the first half-shell 153A is coupled to the second half-shell 153B. In the embodiment depicted in FIGS. 2A and 2B, the first half-shell 153A defines a pair of first cavities 157A, 157B, and the second half-shell 153B defines a pair of second cavities 156A, 156B. In embodiments, the first cavity 157A of the first half-shell 153A and the second cavity 156A of the second half-shell 153B define the first retention housing passageway 154A, while the first cavity 157B of the first half-shell 153A and the second cavity 156B of the second half-shell 153B define the second retention housing passageway 154B when the first half-shell 153A is coupled to the second half-shell 153B.

In embodiments, the first retention housing passageway 154A includes a front passageway 155A positioned at the front portion 102A of the retention housing 153 and a rear passageway 158A positioned at the rear portion 102B of the retention housing 153. In embodiments, the front passageway 155A defines an inner span $S_f$ and the rear passageway 158B defines an inner span $S_r$, wherein the inner span $S_f$ of the front passageway 155B is greater than the inner span $S_r$ of the rear passageway 158B. While the inner span $S_f$ and the inner span $S_r$ are depicted as being evaluated across the second half-shell 153B, it should be understood that the inner span $S_f$ and the inner span $S_r$ may be evaluated across the first retention housing passageway with the first and the second half-shells 153A, 153B coupled to one another. Because the inner span $S_r$ of the rear passageway 158B is less than the inner span $S_f$ of the front passageway 155B, the first retention housing passageway 154A may retain a connector housing sized to fit within the front passageway 155B and the rear passageway 158B, as described in greater detail herein.

In embodiments, the second retention housing passageway 154B includes a front passageway 155B positioned at the front portion 102A of the retention housing 153 and a rear passageway 158B positioned at the rear portion 102B of the retention housing 153. In embodiments, the front passageway 155B may be substantially the same as the front passageway 155A, defining an inner span $S_f$ and the rear passageway 158B may be substantially the same as the rear passageway 158A and defines an inner span $S_r$, wherein the inner span $S_f$ of the front passageway 155B is greater than the inner span $S_r$ of the rear passageway 158B.

When fully assembled, the retention housing 153 fits at least partially into the shroud 160. Additionally, in some embodiments, the retention housing 153 may be keyed to the shroud 160 using configurations such as a complementary protrusion/groove or the like to direct the insertion of the retention housing 153 and/or to restrict rotation of the retention housing 153 with respect to the shroud 160.

In embodiments, the first and second connector housings 151A, 151B are substantially the same and each extend between a front portion 188 and a rear portion 159 positioned opposite the front portion 188. In embodiments, the first and second connector housings 151A, 151B comprise a ferrule retention portion 191 positioned at the front portion 188 of the first and second connector housings 151A, 151B. The ferrule retention portion 191 of the first and second connector housings 151A, 151B define an outer span $S_{fr}$, and the rear portion 159 defines an outer span $S_{rr}$, wherein the outer span $S_{fr}$ of the ferrule retention portion 191 is greater than the outer span $S_{rr}$ of rear portion 159 of the first and second connector housings 151A, 151B. In embodiments, the outer span $S_{fr}$ of the ferrule retention portion 191 of the first and second connector housings 151A, 151B is selected to fit within the front passageways 155A, 155B of the retention housing 153, respectively, and the outer span $S_{rr}$ of the rear portion 159 of the first and second connector housings 151A, 151B is selected to fit within the rear passageways 158A, 158B of the retention housing 153.

In embodiments, the ferrule retention portion 191 of each of the first and second connector housings 151A, 151B is structurally configured to retain a plurality of ferrules. In embodiments, ferrules 152A, 152B each terminate an associated optical fiber 186.

In the embodiment depicted in FIG. 2A, the ferrule retention portion 191 of the first connector housing 151A retains a pair of ferrules 152A positioned at least partially within the ferrule retention portion 191 of the first connector housing 151A. In some embodiments, the second connector housing 151B is substantially the same as the first connector housing 151A, and the ferrule retention portion 191 of the second connector housing 151B retains a pair of ferrules 152B positioned at least partially within the ferrule retention portion 191 of the second connector housing 151B. In some embodiments, the first connector housing 151A and the second connector housing 151B do not include the same number of ferrules. For example, in some embodiments, the first connector housing 151A may retain the pair of ferrules 152A, while the second connector housing 151B retains a single ferrule. In other embodiments, the first and/or the second connector housing 151A, 151B may include more than two ferrules.

In some embodiments, the pair of ferrules 152A associated with the first connector housing 151A and/or the pair of ferrules 152B of the second connector housing 151B define a diameter that is about 3.8 millimeters or less. In some embodiments the pair of ferrules 152A associated with the first connector housing 151A and/or the pair of ferrules 152B associated with the second connector housing 151B are spaced apart from one another by pitch that is 1.25 millimeters or less. In the depicted embodiment, each of the first connector housing 151A and the second connector housing 151B are configured as CS optical connectors that provide a CS interface. By configuring the first connector housing 151A and/or the second connector housing 151B with a CS interface, the first connector housing 151A and/or the second connector housing 151B may interface with similarly configured connectors of the optical receptacle assembly 110, as described in greater detail herein. Furthermore by configuring the first connector housing 151A and/or the second connector housing 151B as CS connectors, it is possible to provide four ferrules within the comparatively small shroud 160. It should be understood that other optical connector types may be utilized, such as DC, Mini-CS/DC, and the like.

Referring to FIG. 2A, the optical receptacle assembly 110 may be provided in an enclosure of an interface device, such as an aerial interface device or within an enclosure on the ground. In embodiments, the optical receptacle assembly 110 generally includes a receptacle housing 111, an adapter sleeve 120, and an adapter housing 140. In embodiments, the optical receptacle assembly 110 further includes at least one receptacle optical connector 130A that is insertable within the adapter housing 140. In the embodiment depicted in FIG. 2A, the optical receptacle assembly 110, the at least one receptacle optical connector 130A is a first receptacle optical connector 130A, and the optical receptacle assembly 110 further includes a second receptacle optical connector 130B.

The receptacle housing 111 generally includes an outer threaded surface 114 configured such that the optical receptacle assembly 110 may be threadedly mounted within a bulkhead of an interface device, thereby providing an optical port. In embodiments, the receptacle housing 111 defines a receptacle passage 113 extending between a first end 112A and a second end 112B. In embodiments, the adapter sleeve 120 may be positioned at least partially within the receptacle passage 113 of the receptacle housing 111, as described in greater detail herein.

In embodiments, the receptacle housing 111 includes flange 115 provided at the first end 112A of the receptacle housing 111. As best shown in FIG. 5, the flange 115 of the receptacle housing 111 defines an inner notch 193, in embodiments. When the adapter sleeve 120 is within the receptacle housing 111, a circumferential groove 127 of the adapter sleeve 120 is seated within the inner notch 193 of the flange 115 of the receptacle housing 111. A sealing member 124, which may be configured as an O-ring, provides a seal between the adapter sleeve 120 and the receptacle housing 111.

As shown in FIG. 2A, the adapter sleeve 120 comprises a main body 123 at a second end 121B and an exposed portion 196 and a flange portion 125 at a first end 121A. A sleeve passage 122 extends between the first end 121A and the second end 121B. As shown in FIG. 2A, the exposed portion 196 and the flange portion 125 extend out of the receptacle housing 111. The circumferential groove 127 separates the main body 123 and the exposed portion 196. The main body 123 may have a diameter that is smaller than the exposed portion 196 to aid in seating the adapter sleeve 120 within the receptacle housing 111. The circumferential groove 127 defines a shoulder 197 facing the second end 121B of the adapter sleeve 120, and provides a location that receives the sealing member 124 that provides a sealing interface between the adapter sleeve 120 and the receptacle housing 111.

The main body 123 of the adapter sleeve 120 comprises at least one engagement tab for mating with the receptacle housing 111. In the embodiment depicted in FIG. 2A, the adapter sleeve 120 comprises a first engagement tab 128A and a second engagement tab 128B located on opposite sides of the main body 123. The first engagement tab 128A and the second engagement tab 128B are separated from the remaining material of the main body 123 by notches such that the first engagement tab 128A and the second engagement tab 128B may radially flex independent of the main body 123. Each of the first engagement tab 128A and the second engagement tab 128B has a detent 198 at its end. The detent 198 has an angled outer surface that is angle away from a centerline of the adapter sleeve 120 and toward the first end 121A.

Generally, most of the components of the optical receptacle assembly 110 may be formed from a suitable polymer. As a non-limiting example, the polymer may be a UV stabilized polymer such as ULTEM 2210; however, other suitable materials are possible. For instance, stainless steel or any other suitable metal may be used for various components.

Figure 3:
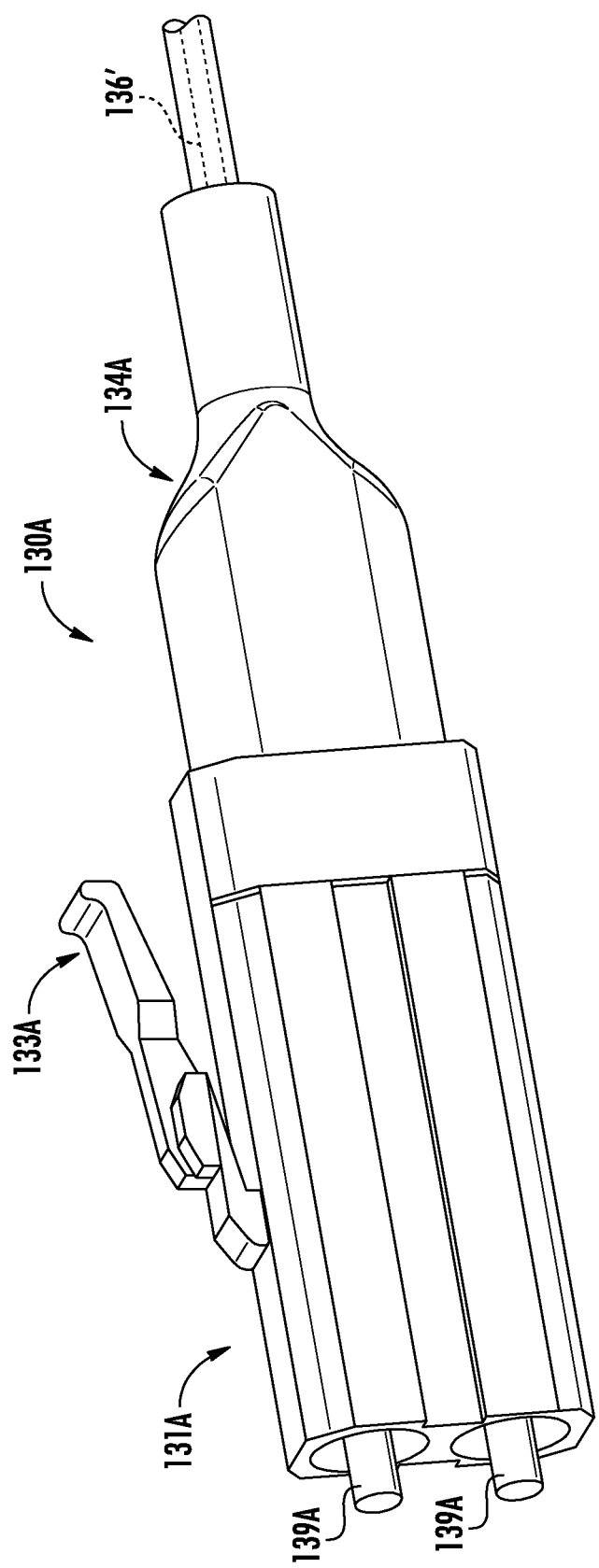
FIG. 3 schematically depicts a perspective view of a receptacle optical connector of the optical receptacle assembly of FIG. 2A, according to one or more embodiments described and depicted herein.

Referring to FIGS. 2A and 3, the first receptacle optical connector 130A is depicted in isolation. In embodiments, the first receptacle optical connector 130A and the second receptacle optical connector 130B are substantially the same. While reference is made herein to components of the first receptacle optical connector 130A as depicted in FIG. 3, it should be understood that the second receptacle optical connector 130B generally includes identical components.

The first receptacle optical connector 130A generally includes a receptacle ferrule retention portion 131A positioned at a front portion of the first receptacle optical connector 130A, wherein the receptacle ferrule retention portion 131A is structurally configured to retain a plurality of receptacle ferrules. In the embodiment depicted in FIG. 3, a pair of receptacle ferrules 139A are positioned at least partially within the ferrule retention portion 131A of the first receptacle optical connector 130A. While the embodiment depicted in FIG. 3 shows the first receptacle optical connector 130A retaining the pair of receptacle ferrules 139A, it should be understood that in some embodiments, the first receptacle optical connector 130A may include a single receptacle ferrule, or more than two receptacle ferrules 139A. Additionally, in embodiments, the second receptacle optical connector 130B may retain the same number of receptacle ferrules as the first receptacle optical connector 130A, or may include a different number of receptacle ferrules. In embodiments, the pair of receptacle ferrules 139A define a diameter that is about 3.8 millimeters or less. In some embodiments the pair of receptacle ferrules 139A are spaced apart from one another by pitch that is 1.25 millimeters or less. In the depicted embodiment, the first receptacle optical connector 130A and the second receptacle optical connector 130B are configured as CS optical connectors that provide a CS interface, corresponding to the first and second connector housings 151A, 151B. It some embodiments, other optical connector types may be utilized, such as DC, Mini-CS/DC, and the like.

In embodiments, the receptacle ferrules 139A terminate receptacle optical fibers 136. The receptacle optical fibers 136 may be optically connected to the optical fibers 186 (FIG. 1A) of the optical plug connector assembly 150, as described in greater detail herein.

Still referring to FIGS. 2A and 3, in embodiments the first and second receptacle optical connectors 130A, 130B include a flexible locking tab 133 extending from a top surface of the receptacle ferrule retention portion 131. The first and second receptacle optical connectors 130A, 130B also include a rear portion 134 shaped to surround an outer coating of the receptacle optical fibers 136 and to provide strain relief thereto.

Figure 4A:
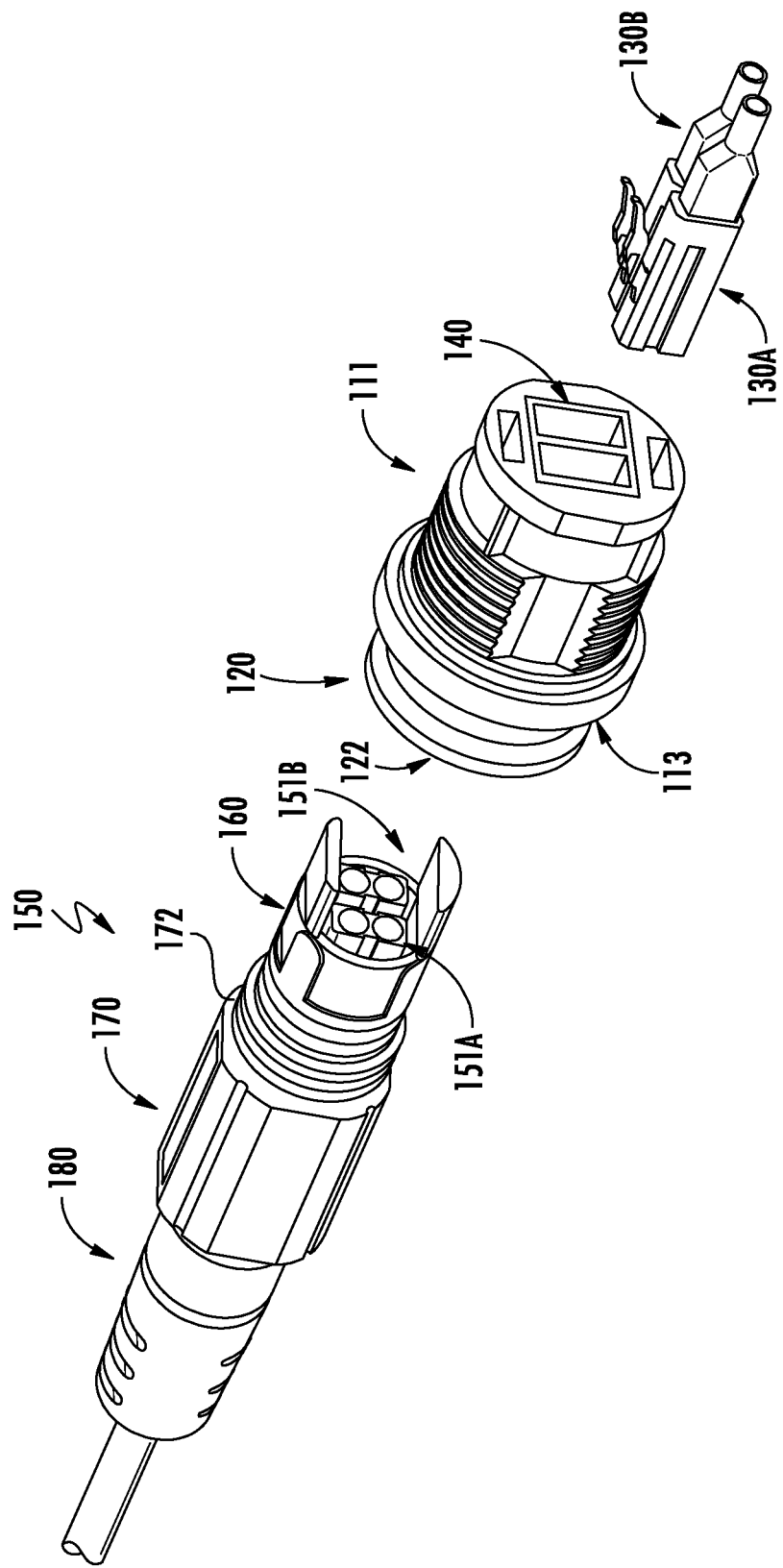
FIG. 4A schematically depicts a front perspective view of the optical connection system of FIG. 2A in the un-mated state, according to one or more embodiments described and depicted herein.
Figure 4B:
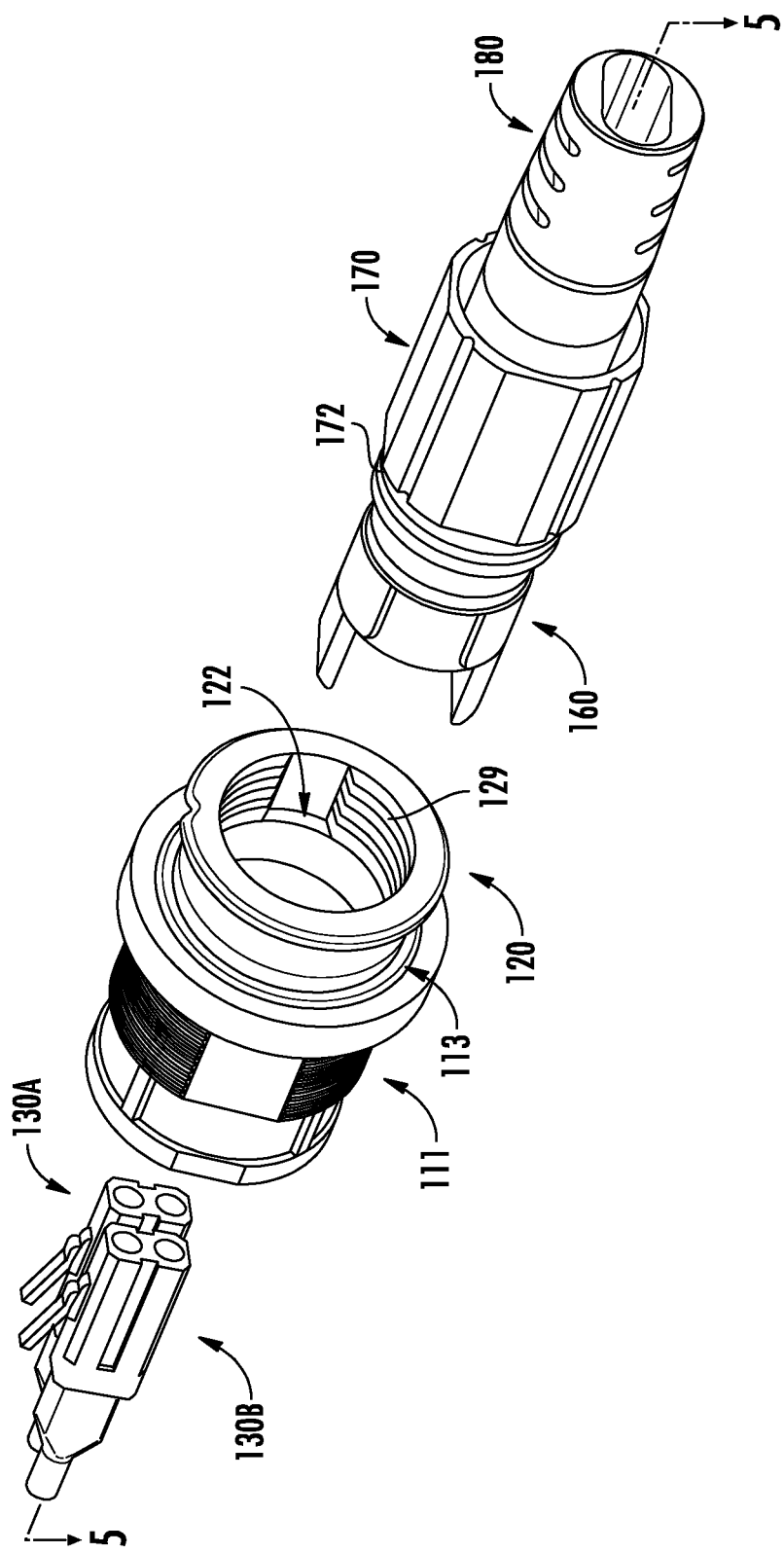
FIG. 4B schematically depicts a rear perspective view of the optical connection system of FIG. 2A in the un-mated state, according to one or more embodiments described and depicted herein.

Referring now to FIGS. 4A-5, several views cutaway and cross-sectional views of the optical plug connector assembly 150 and the optical receptacle assembly 110 are shown in an un-mated state. In embodiments, the adapter sleeve 120 is positioned at least partially within the receptacle passage 113 of the receptacle housing 111. An inner threaded surface 129 is present within the sleeve passage 122 of the adapter sleeve for threadably engaging the threaded outer surface 172 of a coupling nut 170 of a mated optical plug connector assembly 150. In particular, the optical plug connector assembly 150 may be coupled to the optical receptacle assembly 110 by screwing the coupling nut 170 into the inner threaded surface 129 of the adapter sleeve 120. Thus, the optical plug connector assembly 150 and the optical receptacle assembly 110 are easily coupled and decoupled.

The optical plug connector assembly 150 may be decoupled from the optical receptacle assembly 110 by unscrewing the coupling nut 170 from the adapter sleeve 120 and pulling the optical plug connector assembly 150 away from the optical receptacle assembly 110. Thus, the optical plug connector assembly 150 and the optical receptacle assembly 110 are easily coupled and decoupled.

Figure 6:
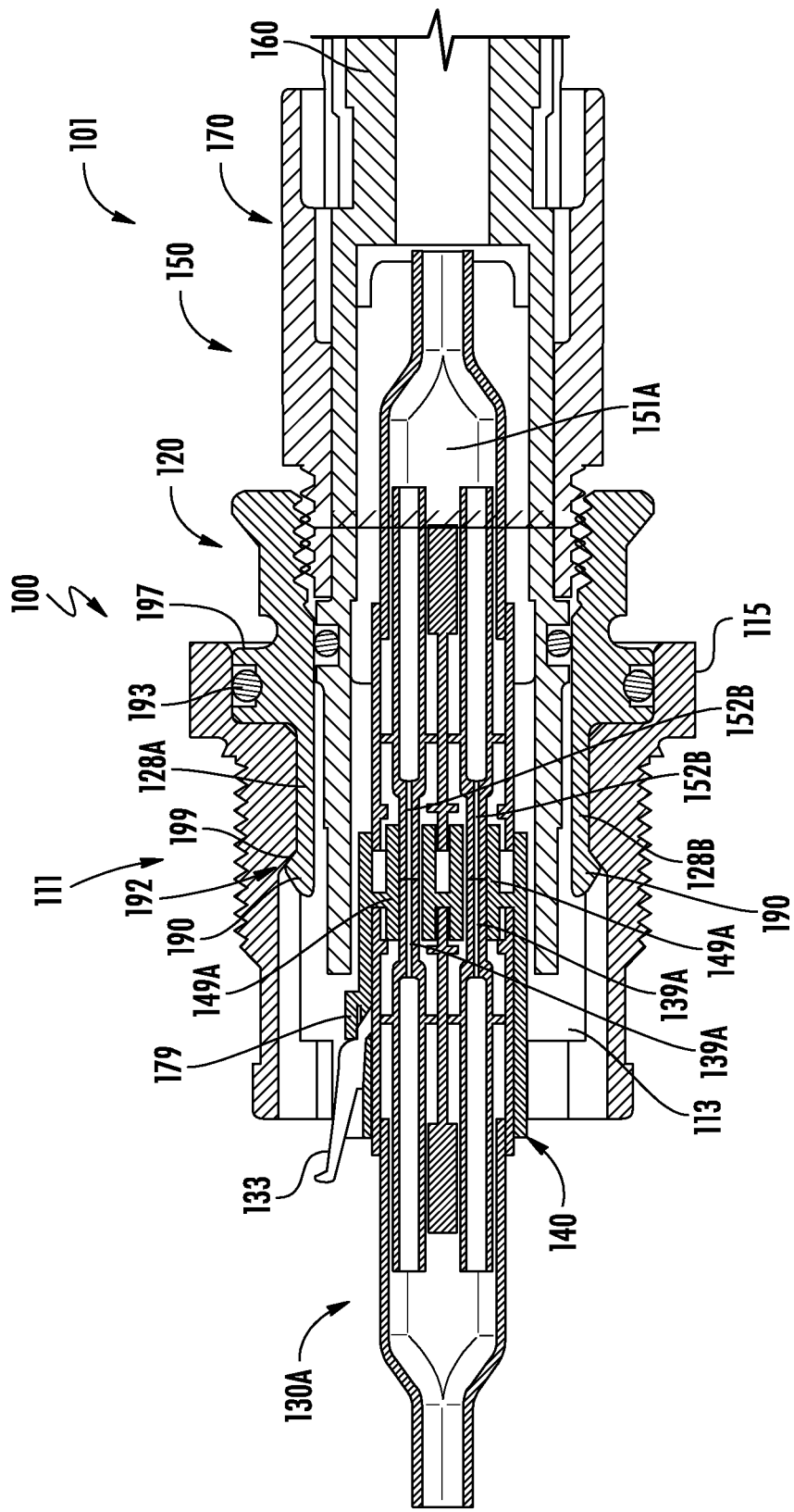
FIG. 6 schematically depicts a section view of the optical connection system of FIG. 2A in a mated state, according to one or more embodiments described and depicted herein.
Figure 7:
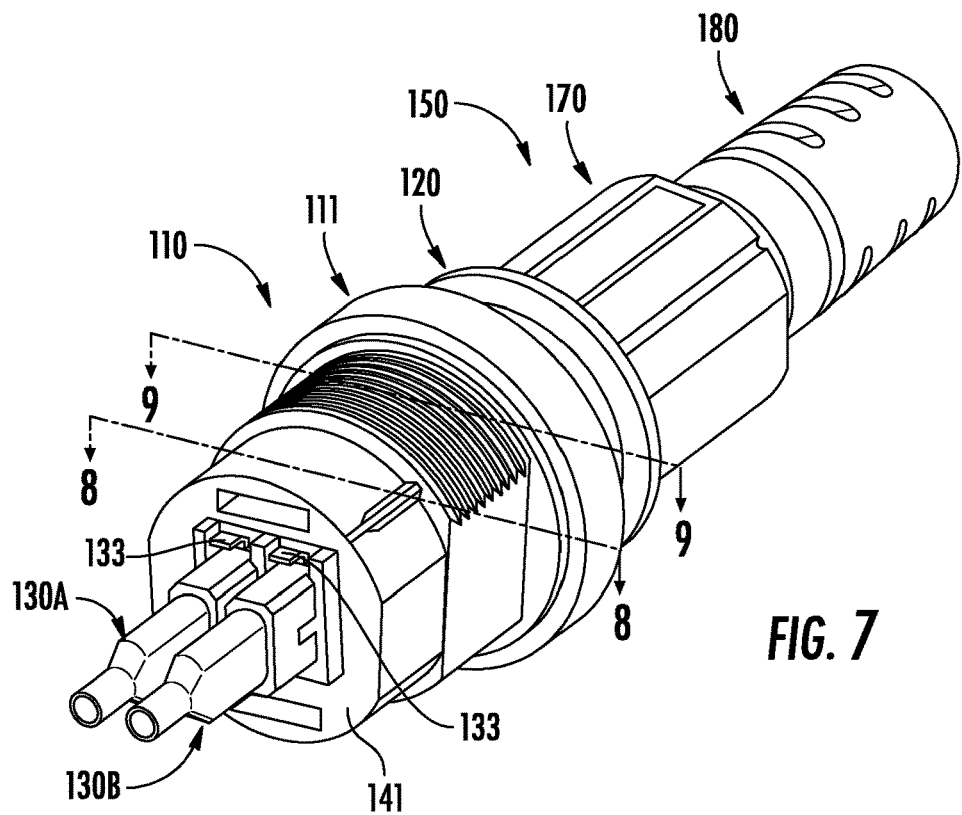
FIG. 7 schematically depicts a perspective view of the optical connection system of FIG. 2A in the mated state, according to one or more embodiments described and depicted herein.
Figure 8:
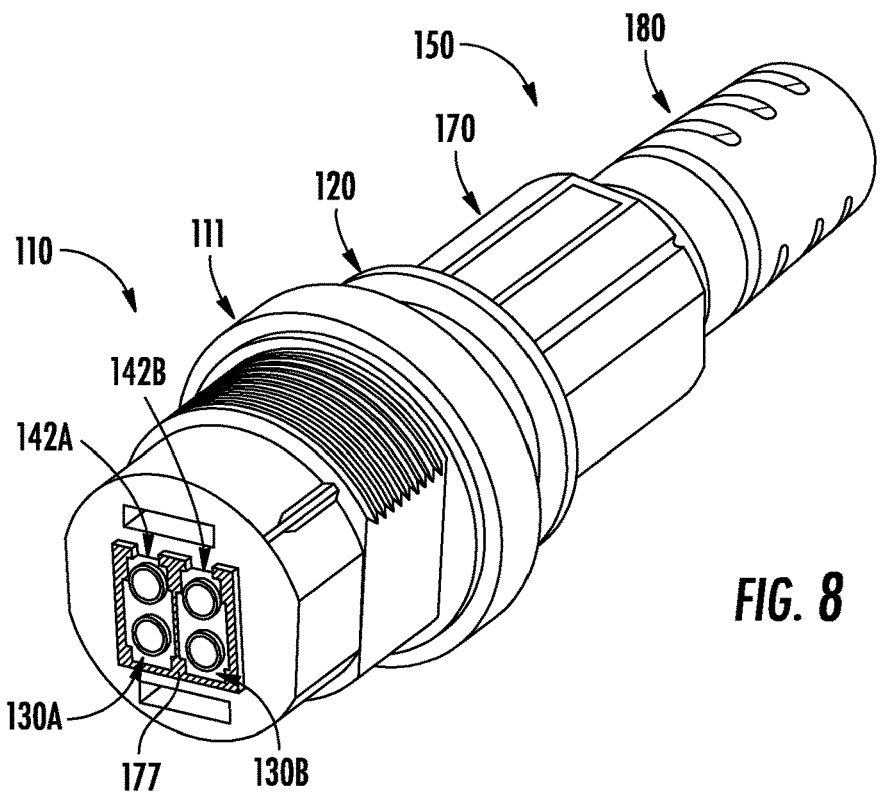
FIG. 8 schematically a section view of the optical connection system along section 8-8 of FIG. 7, according to one or more embodiments described and depicted herein.
Figure 9:
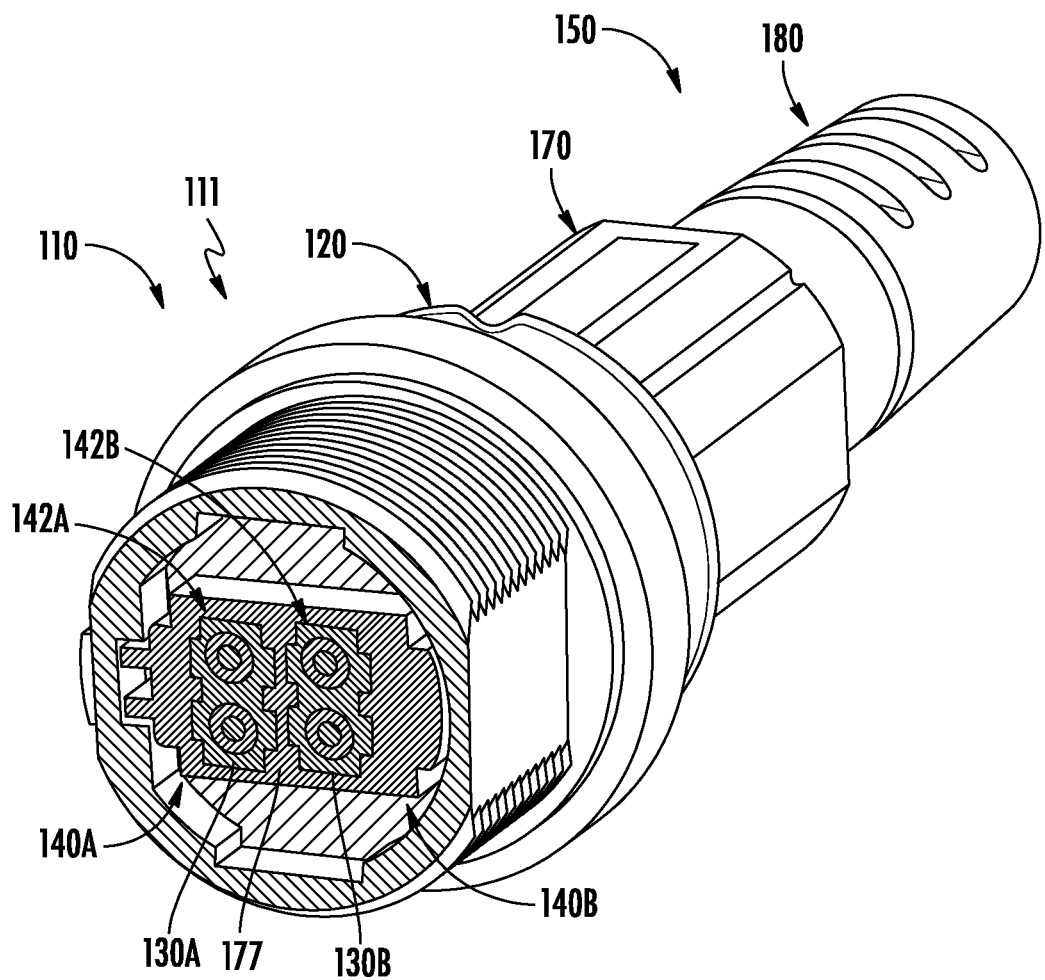
FIG. 9 schematically a section view of the optical connection system along section 9-9 of FIG. 7, according to one or more embodiments described and depicted herein.

Referring to FIG. 6, a section view of the optical connection system 100 with the optical plug connector assembly 150 inserted within the optical receptacle assembly 110. When the main body 123 of adapter sleeve 120 is inserted into the receptacle passage 113 of the receptacle housing 111, the detent 198 of the first engagement tab 128A and the second engagement tab 128B contacts a surface of the receptacle housing 111, causing the first engagement tab 128A and the second engagement tab 128B to be inwardly flexed. The opening of the receptacle passage 113 may have a tapered surface 199, and the end surface of the detent 198 may also be angled to allow the detent 198 to slidably engage the tapered surface 199 and flex the first engagement tab 128A and the second engagement tab 128B. Once the detent 198 reaches a shoulder 192 of the optical receptacle assembly 110, the first engagement tab 128A and the second engagement tab 128B return to a neutral position such that the detent 198 engages the shoulder 192, thereby locking the adapter sleeve 120 within the receptacle passage 113. The first engagement tab 128A and the second engagement tab 128B may be released from the shoulder 192 through the first and second openings 118A, 118B using a tool, for example.

Referring to FIGS. 6-9, perspective and section views of the optical plug connector assembly 150 and the optical receptacle assembly 110 in the mated state are schematically depicted. In embodiments, the adapter housing 140 comprises a housing body 141 having a first connector opening 142A for receiving the first receptacle optical connector 130A and a second connector opening 142B for receiving the second receptacle optical connector 130B. The locking tabs 133 of the first and second receptacle optical connectors 130A, 130B engage features 179 of the adapter housing 140 to removably latch the first and second receptacle optical connectors 130A, 130B to the adapter housing 140. The first and second connector openings 142A, 142B are separated by a central wall 177 and extend along the length of the adapter housing 140. As best shown in FIG. 5, the adapter housing 140 has at least one tab 143 that extends from each side. Each of the tabs 143 engage a bias member 116 disposed between the tabs 143 and a rear wall 117 of the receptacle housing 111.

While in the embodiment depicted in FIGS. 6-9, the adapter housing 140 is depicted as including a monolithic construction, in some embodiments, the adapter housing 140 may be formed from separate components. For example, in some embodiments, the first connector opening 142A may be movable with respect to the second connector opening 142A, such that the adapter housing 140 allows the first and second receptacle optical connectors 130A, 130B some freedom of movement with respect to one another when coupled to the adapter housing 140. By allowing the first and second receptacle optical connectors 130A, 130B to move with respect to one another, the adapter housing 140 may improve the connection between the first and second receptacle optical connectors 130A, 130B and the first and second connector housings 151A, 151B, respectively.

When the optical connection system 100 is assembled, the adapter housing 140 aligns the ferrules associated with the first and second receptacle optical connectors 130A, 130B with the ferrules associated with the first and second connector housings 151A, 151B. For example and as best shown in FIG. 6, the adapter housing 140 includes ferrule cavities that align the ferrules of the first and second the first and second receptacle optical connectors 130A, 130B with the ferrules associated with the first and second connector housings 151A, 151B. In the section view depicted in FIG. 6, first ferrule cavities 149A are depicted aligning the receptacle ferrules 139A associated with the first receptacle optical connector 130A with the ferrules 152A associated with the first connector housing 151A. While in the section view depicted in FIG. 6 the first receptacle optical connector 130A and the first connector housing 151A are depicted, it should be understood that the adapter housing 140 may include second ferrule cavities for aligning the ferrules 139B (FIG. 2A) associated with the second receptacle optical connector 130B (FIG. 2A) with the ferrules 152B (FIG. 2) of the second connector housing 151B (FIG. 2).

It should now be understood that embodiments of the present disclosure are directed to optical receptacle assemblies, optical plug connector assemblies, optical cable assemblies and optical connection system having an optical connector arrangement for routing multiple optical fibers to a single premises.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An optical plug connector assembly comprising:
   a shroud extending between a front portion and a rear portion positioned opposite the front portion, wherein:
      the shroud defines a shroud passageway extending between the front portion and the rear portion of the shroud,
      the shroud comprises at least one finger extending forward from the front portion of the shroud, and
      the shroud defines an outer coupling surface;
   a coupling nut comprising a threaded outer surface and a coupling nut passageway, wherein the outer coupling surface of the shroud is positioned at least partially within the coupling nut passageway such that the coupling nut rotates about the outer coupling surface of the shroud;
   a retention housing positioned at least partially within the shroud passageway, the retention housing defining:
      a front portion and a rear portion positioned opposite the front portion of the retention housing, and
      a retention housing passageway extending between the rear portion and the front portion, the retention housing passageway defining a front passageway positioned at the front portion of the retention housing and a rear passageway positioned at the rear portion of the retention housing, wherein the front passageway defines an inner span that is greater than an inner span of the rear passageway, and
   a connector housing positioned at least partially within the retention housing passageway, the connector housing comprising a ferrule retention portion positioned at a front portion of the connector housing, wherein the ferrule retention portion of the connector housing is structurally configured to retain a plurality of ferrules.

2. The optical plug connector assembly of claim 1, wherein the ferrule retention portion of the connector housing defines an outer span, and a rear portion of the connector housing defines an outer span, wherein the outer span of the ferrule retention portion is greater than the outer span of the rear portion of the connector housing.

3. The optical plug connector assembly of claim 1, wherein the retention housing passageway is a first retention housing passageway, and the retention housing further defines a second retention housing passageway extending between the rear portion and the front portion of the retention housing, the second retention housing passageway defining a second front passageway positioned at the front portion of the retention housing and a second rear passageway positioned at the rear portion of the retention housing, wherein the second front passageway defines an inner span that is greater than an inner span of the second rear passageway.

4. The optical plug connector assembly of claim 3, wherein the connector housing is a first connector housing, and the optical plug connector assembly further comprises a second connector housing positioned at least partially within the second retention housing passageway, the second connector housing comprising a second ferrule retention portion positioned at a front portion of the second connector housing, wherein the second ferrule retention portion is structurally configured to retain one or more ferrules.

5. The optical plug connector assembly of claim 1, wherein:
   the retention housing comprises a first half-shell coupled to a second half-shell; and
   the first half-shell defines a first cavity and the second half-shell defines a second cavity, wherein the first cavity and the second cavity define the retention housing passageway when the first half-shell is coupled to the second half-shell.

6. The optical plug connector assembly of claim 1, wherein the at least one finger of the shroud is a first finger, and the shroud further comprises a second finger extending forward from the front portion of the shroud, wherein the first finger and the second finger are spaced apart from one another on a perimeter of the shroud.

7. The optical plug connector assembly of claim 6, wherein at least one of the first finger and the second finger comprise a discrete keying feature.

8. The optical plug connector assembly of claim 7, wherein the first finger defines a keying groove extending into the first finger.

9. The optical plug connector assembly of claim 8, wherein the second finger defines a first keying protrusion at a first edge of the second finger and a second keying protrusion at a second edge of the second finger.

10. An optical cable assembly comprising:
a cable comprising:
a cable jacket, and
a plurality of optical fibers positioned within the cable jacket;
an optical plug connector assembly comprising:
a shroud extending between a front portion and a rear portion positioned opposite the front portion, wherein:
the shroud defines a shroud passageway extending between the front portion and the rear portion of the shroud, and
the shroud comprises at least one finger extending forward from the front portion of the shroud, and
the shroud defines an outer coupling surface;
a coupling nut comprising a threaded outer surface and a coupling nut passageway, wherein the outer coupling surface of the shroud is positioned at least partially within the coupling nut passageway such that the coupling nut rotates about the outer coupling surface of the shroud;
a retention housing positioned at least partially within the shroud passageway, the retention housing defining:
a front portion and a rear portion positioned opposite the front portion of the retention housing, and
a retention housing passageway extending between the rear portion and the front portion, the retention housing passageway defining a front passageway positioned at the front portion of the retention housing and a rear passageway positioned at the rear portion of the retention housing, wherein the front passageway defines an inner span that is greater than an inner span of the rear passageway, and
a connector housing positioned at least partially within the retention housing passageway, the connector housing comprising a ferrule retention portion positioned at a front portion of the connector housing; and
a plurality of ferrules, wherein each of the plurality of ferrules terminate an associated optical fiber of the plurality of optical fibers of the cable, wherein the plurality of ferrules are positioned at least partially within the ferrule retention portion of the connector housing.

11. The optical cable assembly of claim 10, wherein the ferrule retention portion of the connector housing defines an outer span, and a rear portion of the connector housing defines an outer span, wherein the outer span of the ferrule retention portion is greater than the outer span of the rear portion of the connector housing.

12. The optical cable assembly of claim 10, wherein the retention housing passageway is a first retention housing passageway, and the retention housing further defines a second retention housing passageway extending between the rear portion and the front portion of the retention housing, the second retention housing passageway defining a second front passageway positioned at the front portion of the retention housing and a second rear passageway positioned at the rear portion of the retention housing, wherein the second front passageway defines an inner span that is greater than an inner span of the second rear passageway.

13. The optical cable assembly of claim 12, wherein the connector housing is a first connector housing, and the optical plug connector assembly comprises a second connector housing positioned at least partially within the second retention housing passageway, the second connector housing comprising a second ferrule retention portion positioned at a front portion of the second connector housing, and wherein at least one of the plurality of ferrules is positioned at least partially within the second ferrule retention portion.

14. The optical cable assembly of claim 10, wherein:
the retention housing comprises a first half-shell coupled to a second half shell; and
the first half-shell defines a first cavity and the second half-shell defines a second cavity, wherein the first cavity and the second cavity define the retention housing passageway when the first half-shell is coupled to the second half-shell.

15. The optical cable assembly of claim 10, wherein the at least one finger of the shroud is a first finger, and the shroud further comprises a second finger extending forward from the front portion of the shroud, wherein the first finger and the second finger are spaced apart from one another on a perimeter of the shroud.

16. The optical cable assembly of claim 15, wherein at least one of the first finger and the second finger comprise a discrete keying feature.

17. The optical cable assembly of claim 15, wherein the first finger defines a keying groove extending into the first finger.

18. The optical cable assembly of claim 17, wherein the second finger defines a first keying protrusion at a first edge of the second finger and a second keying protrusion at a second edge of the second finger.

19. An optical receptacle assembly comprising:
a receptacle housing comprising a body portion, wherein the receptacle housing defines a receptacle passage;
an adapter sleeve positioned at least partially within the receptacle passage of the receptacle housing, the adapter sleeve comprising a sleeve passage and a sleeve inner threaded surface;
an adapter housing disposed within the receptacle passage, the adapter housing defining a connector opening;
a receptacle optical connector positioned at least partially within the connector opening of the adapter housing, the receptacle optical connector comprising a receptacle ferrule retention portion positioned at a front portion of the receptacle optical connector, wherein the receptacle ferrule retention portion is structurally configured to retain a plurality of ferrules; and
at least one bias member disposed between at least one tab of the adapter housing and a wall of the receptacle housing such that the at least one bias member biases the adapter housing within the receptacle housing.

20. The optical receptacle assembly of claim 19, wherein the connector opening of the adapter housing is a first connector opening, and the adapter housing further defines a second connector opening.

21. The optical receptacle assembly of claim 20, wherein the receptacle optical connector is a first receptacle optical connector, and the optical receptacle assembly further comprises a second receptacle optical connector positioned at least partially within the second connector opening, the second receptacle optical connector comprising a second receptacle ferrule retention portion positioned at a front portion of the second receptacle optical connector, wherein the second receptacle ferrule retention portion is structurally configured to retain one or more ferrules.

22. The optical receptacle assembly of claim 19, wherein the adapter housing is at least partially disposed within the sleeve passage of the adapter sleeve.

23. The optical receptacle assembly of claim 22, wherein:
an inner surface of the receptacle housing that defines the receptacle passage comprises a shoulder;
the adapter sleeve comprises at least one engagement tab; and
the at least one engagement tab contacts the shoulder to maintain the adapter sleeve within the receptacle passage of the receptacle housing.

24. The optical receptacle assembly of claim 19, wherein the receptacle optical connector is removably positioned within the connector opening by a locking tab.

25. The optical receptacle assembly of claim 19, wherein:
the receptacle housing comprises a flange portion and an inner notch within the flange portion;
the adapter sleeve comprises a circumferential groove and a sealing member within the circumferential groove; and
the circumferential groove of the adapter sleeve is disposed within the inner notch of the flange portion of the receptacle housing.

26. An optical connection system comprising:
an optical receptacle assembly comprising:
a receptacle housing comprising a body portion, wherein the receptacle housing defines a receptacle passage;
an adapter sleeve disposed within the receptacle passage of the receptacle housing, the adapter sleeve comprising a sleeve passage and a sleeve inner threaded surface;
an adapter housing disposed within the receptacle passage, the adapter housing defining a connector opening; and
a receptacle optical connector positioned at least partially within the connector opening of the adapter housing, the receptacle optical connector comprising a receptacle ferrule retention portion positioned at a front portion of the receptacle optical connector; and
a plurality of receptacle ferrules positioned at least partially within the receptacle ferrule retention portion of the receptacle optical connector;
an optical cable assembly comprising:
a cable comprising:
a cable jacket, and
a plurality of optical fibers positioned within the cable jacket;
an optical plug connector assembly comprising:
a shroud extending between a front portion and a rear portion positioned opposite the front portion, wherein:
the shroud defines a shroud passageway extending between the front portion and the rear portion of the shroud, and
the shroud comprises at least one finger extending forward from the front portion of the shroud;
a retention housing positioned at least partially within the shroud passageway, the retention housing defining:
a front portion and a rear portion positioned opposite the front portion of the retention housing, and
a retention housing passageway extending between the rear portion and the front portion, the retention housing passageway defining a front passageway positioned at the front portion of the retention housing and a rear passageway positioned at the rear portion of the retention housing, wherein the front passageway defines an inner span that is greater than an inner span of the rear passageway, and
a connector housing positioned at least partially within the retention housing passageway, the connector housing comprising a ferrule retention portion positioned at a front portion of the connector housing; and
a plurality of ferrules, wherein each of the plurality of ferrules terminate an associated optical fiber of the plurality of optical fibers of the cable, wherein the plurality of ferrules are positioned at least partially within the ferrule retention portion of the connector housing and each of the plurality of ferrules are aligned with associated receptacle ferrules of the plurality of receptacle ferrules.

27. The optical connection system of claim 26, wherein the connector opening of the adapter housing is a first connector opening, and the adapter housing further defines a second connector opening.

28. The optical connection system of claim 27, wherein the receptacle optical connector is a first receptacle optical connector, and the optical receptacle assembly further comprises a second receptacle optical connector positioned at least partially within the second connector opening, the second receptacle optical connector comprising a second receptacle ferrule retention portion positioned at a front portion of the second receptacle optical connector, wherein at least one receptacle ferrule of the plurality of receptacle ferrules is positioned within the second receptacle ferrule retention portion.

29. The optical connection system of claim 26, wherein the adapter housing is at least partially disposed within the sleeve passage of the adapter sleeve.

30. The optical connection system of claim 29, wherein:
an inner surface of the receptacle housing that defines the receptacle passage comprises a shoulder;
the adapter sleeve comprises at least one engagement tab; and
the at least one engagement tab contacts the shoulder to maintain the adapter sleeve within the receptacle passage of the receptacle housing.

31. The optical connection system of claim 26, wherein the optical receptacle assembly comprises at least one bias member disposed between at least one tab of the adapter housing and a wall of the receptacle housing such that the at least one bias member biases the adapter housing within the receptacle housing.

32. The optical connection system of claim 26, wherein the receptacle optical connector is removably positioned within the connector opening by a locking tab.

33. The optical connection system of claim 26, wherein:
the receptacle housing comprises a flange portion and an inner notch within the flange portion;
the adapter sleeve comprises a circumferential groove and a sealing member within the circumferential groove; and
the circumferential groove of the adapter sleeve is disposed within the inner notch of the flange portion of the receptacle housing.

34. The optical connection system of claim 26, wherein the shroud defines an outer coupling surface and the optical plug connector assembly further comprises a coupling nut comprising a threaded outer surface and a coupling nut passageway, wherein the outer coupling surface of the shroud is positioned at least partially within the coupling nut passageway such that the coupling nut rotates about the outer coupling surface of the shroud.

35. The optical connection system of claim 34, wherein the threaded outer surface of the coupling nut is engaged with the sleeve inner threaded surface of the adapter sleeve.

* * * * *

UNITED STATES PATENT AND TRADEMARK OFFICE
CERTIFICATE OF CORRECTION

PATENT NO. : 10,852,487 B1
APPLICATION NO. : 16/536372
DATED : December 1, 2020
INVENTOR(S) : Eric Ignatius et al.

Page 1 of 1

It is certified that error appears in the above-identified patent and that said Letters Patent is hereby corrected as shown below:

In the Claims

In Column 16, Line 15, Claim 14, delete "half shell;" and insert -- half-shell; --, therefor.

Signed and Sealed this
Ninth Day of February, 2021

Drew Hirshfeld
*Performing the Functions and Duties of the
Under Secretary of Commerce for Intellectual Property and
Director of the United States Patent and Trademark Office*